(12) United States Patent
Li et al.

(10) Patent No.: US 12,452,720 B2
(45) Date of Patent: Oct. 21, 2025

(54) MEASUREMENT REPORTING METHOD AND APPARATUS IN NTN, RECEIVING METHOD AND APPARATUS, AND DEVICE AND MEDIUM

(71) Applicant: GUANGDONG OPPO MOBILE TELECOMMUNICATIONS CORP., LTD., Guangdong (CN)

(72) Inventors: Haitao Li, Dongguan (CN); Yi Hu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 396 days.

(21) Appl. No.: 18/146,347

(22) Filed: Dec. 23, 2022

(65) Prior Publication Data

US 2023/0224749 A1   Jul. 13, 2023

Related U.S. Application Data

(63) Continuation of application No. PCT/CN2020/123761, filed on Oct. 26, 2020.

(51) Int. Cl.
*H04W 24/10* (2009.01)
*H04B 7/185* (2006.01)
(Continued)

(52) U.S. Cl.
CPC ........ *H04W 24/10* (2013.01); *H04B 7/18519* (2013.01); *H04L 1/0026* (2013.01);
(Continued)

(58) Field of Classification Search
CPC ............. H04W 24/10; H04W 36/0088; H04W 36/302; H04W 36/322; H04B 7/18519; H04L 1/0026

See application file for complete search history.

(56) References Cited

U.S. PATENT DOCUMENTS

2018/0324738 A1   11/2018   Stirling-Gallacher et al.
2020/0178135 A1*  6/2020   Yun ................... H04W 36/0061
(Continued)

FOREIGN PATENT DOCUMENTS

CN   106231626 A   12/2016
CN   110035464 A   7/2019
(Continued)

OTHER PUBLICATIONS

CATT: "Considerations on NTN mobility", 3GPP Draft; R3-190242, 3rd Generation Partnership Project (3GPP), Mobile Competence Centre; 650, Route Des Lucioles; F-06921 Sophia-Antipolis Cedex; France, vol. RAN WG3, No. Athens, Greece; Feb. 25, 2019-Mar. 1, 2019, Feb. 15, 2019 (Feb. 15, 2019), pp. 1-6, XP051604185, 2 Discussion. 6 pages.

(Continued)

*Primary Examiner* — Deepa Belur
(74) *Attorney, Agent, or Firm* — PERKINS COIE LLP (57) ABSTRACT

Disclosed are a measurement reporting method and apparatus in an NTN, a receiving method and apparatus, and a device and a medium, the measurement reporting method in an NTN being applied to a terminal. The method includes: receiving a measurement configuration; and reporting a first measurement result and a second measurement result according to the measurement configuration, wherein the first measurement result is a position-related measurement result, and the second measurement result is a measurement result of at least one of the signal quality of a serving cell and the signal quality of a neighbor cell.

17 Claims, 5 Drawing Sheets

(51) Int. Cl.
  *H04L 1/00* (2006.01)
  *H04W 36/00* (2009.01)
  *H04W 36/30* (2009.01)
  *H04W 36/32* (2009.01)

(52) U.S. Cl.
  CPC ..... *H04W 36/0088* (2013.01); *H04W 36/302* (2023.05); *H04W 36/322* (2023.05)

(56) References Cited

U.S. PATENT DOCUMENTS

| | | | |
|---|---|---|---|
| 2021/0083760 A1 | 3/2021 | Schmidt et al. | |
| 2021/0321335 A1* | 10/2021 | Xu | H04W 24/10 |
| 2021/0345215 A1 | 11/2021 | Sun | |
| 2022/0030532 A1 | 1/2022 | Hajir | |
| 2022/0086671 A1 | 3/2022 | Hong | |
| 2023/0276336 A1* | 8/2023 | Wu | H04W 36/326 370/331 |
| 2023/0397032 A1* | 12/2023 | Yavuz | H04W 36/322 |
| 2024/0179583 A1* | 5/2024 | Rao | G01S 5/0036 |

FOREIGN PATENT DOCUMENTS

| | | |
|---|---|---|
| CN | 111010708 A | 4/2020 |
| CN | 111182579 A | 5/2020 |
| CN | 111819803 A | 10/2020 |
| EP | 3866504 A1 | 8/2021 |
| WO | 2019170866 A1 | 9/2019 |
| WO | 2020145559 A1 | 7/2020 |
| WO | 2020163610 A1 | 8/2020 |

OTHER PUBLICATIONS

Supplementary European Search Report in the European application No. 20958957.1, mailed on Oct. 23, 2023. 14 pages.
Notice of Rejection of the Chinese application No. 202310934824.5, issued on Nov. 30, 2024, 16 pages with English translation.
First Office Action of the European application No. 20958957.1, issued on Jul. 10, 2024. 6 pages.
First Office Action of the Chinese application No. 202310934824.5, issued on Sep. 5, 2024. 17 pages with English translation.
3GPP TSG-RAN WG2 Meeting #112E R2-2009803, Electronic, Nov. 2-13, 2020, Agenda item: 8.10.3.3, Source: ZTE Corporation, Sanechips, Title: Report of [Post111-e] [911] [NTN] Connected mode aspects (ZTE), Document for: Discussion & Decision. pp. 1-49.
3GPP TR 38.821 V1.0.0 (Dec. 2019),3rd Generation Partnership Project;Technical Specification Group Radio Access Network;Solutions for NR to support non-terrestrial networks (NTN) (Release 16).
International Search Report in the international application No. PCT/CN2020/123761, mailed on Jul. 27, 2021.
English translation of the Written Opinion of the International Search Authority in the international application No. PCT/CN2020/123761, mailed on Jul. 27, 2021.

* cited by examiner

MEASUREMENT REPORTING METHOD AND APPARATUS IN NTN, RECEIVING METHOD AND APPARATUS, AND DEVICE AND MEDIUM

CROSS-REFERENCE TO RELATED APPLICATION

This is a continuation of International Application No. PCT/CN2020/123761, filed on Oct. 26, 2020, and entitled "MEASUREMENT REPORTING METHOD AND APPARATUS IN NTN, RECEIVING METHOD AND APPARATUS, AND DEVICE AND MEDIUM", the disclosure of which is incorporated therein by reference in its entirety.

BACKGROUND

In the related art, a network device issues a measurement configuration to a User Equipment (UE), and the UE measures a signal quality state of a neighboring cell according to parameters, such as a measurement object and a reporting configuration, indicated in the measurement configuration. Measurement reporting is fed back to the network device after a measurement result of signal quality is obtained. The network device determines whether to perform network handover for the UE or perfects a relationship list of the neighboring cell according to the measurement reporting.

In an NTN scenario, due to huge coverage of a cell, the signal quality state cannot accurately reflect difference between an edge of the cell and middle of the cell. Therefore, how the UE performs the measurement reporting is an urgent technical problem to be solved.

SUMMARY

The present disclosure relates to the technical field of mobile communication, and in particular to a method for measurement reporting and apparatus in a Non-Terrestrial Network (NTN), a receiving method and apparatus, and a device and a medium Embodiments of the present disclosure provide a method for measurement reporting and apparatus in an NTN, a receiving method and apparatus, and a device and a medium. A network device simultaneously receives multiple measurement results through additional report of a measurement result related to a position and a measurement result related to signal quality. The technical solutions are as follows.

According to an aspect of the present disclosure, a method for measurement reporting in an NTN is provided, which is applied to a UE and includes the following operations.

A measurement configuration is received.

A first measurement result and a second measurement result are reported according to the measurement configuration. The first measurement result is a measurement result related to a position. The second measurement result is a measurement result of at least one of signal quality of a serving cell or signal quality of a neighboring cell.

According to an aspect of the present disclosure, a method for receiving a measurement report in an NTN is provided, which is be applied to a network device and includes the following operations.

A measurement configuration is sent.

A first measurement result and a second measurement result reported simultaneously are received. The first measurement result is a measurement result related to a position. The second measurement result is a measurement result of at least one of signal quality of a serving cell or signal quality of a neighboring cell.

According to an aspect of the present disclosure, a measurement reporting apparatus in an NTN is provided, which includes a receiving module and a reporting module.

The receiving module is configured to receive a measurement configuration.

The reporting module is configured to report a first measurement result and a second measurement result according to the measurement configuration. The first measurement result is a measurement result related to a position. The second measurement result is a measurement result of at least one of signal quality of a serving cell or signal quality of a neighboring cell.

According to an aspect of the present disclosure, an apparatus for receiving a measurement report in an NTN is provided, which includes a sending module and a receiving module.

The sending module is configured to send a measurement configuration.

The receiving module is configured to receive a first measurement result and a second measurement result reported simultaneously. The first measurement result is a measurement result related to a position. The second measurement result is a measurement result of at least one of signal quality of a serving cell or signal quality of a neighboring cell.

According to an aspect of the present disclosure, a UE is provided. The UE includes a processor and a memory. The memory stores at least one instruction, at least one program, a code set or an instruction set, and the at least one instruction, the at least one program, the code set or the instruction set are loaded and executed by the processor to implement the method for measurement reporting in the NTN as described above.

According to an aspect of the present disclosure, a network device is provided, which includes a processor and a memory. The memory stores at least one instruction, at least one program, a code set or an instruction set, and the at least one instruction, the at least one program, the code set or the instruction set are loaded and executed by the processor to implement the method for receiving a measurement report in an NTN as described above.

According to an aspect of the present disclosure, a computer-readable storage medium is provided. The readable storage medium stores at least one instruction, at least one program, a code set or an instruction set, and the at least one instruction, the at least one program, the code set or the instruction set are loaded and executed by a processor to implement the method for measurement reporting in the NTN as described in the above aspect, or the method for receiving a measurement report in an NTN as described in the above aspect.

BRIEF DESCRIPTION OF THE DRAWINGS

In order to describe the technical solutions of the embodiments of the present disclosure more clearly, the following briefly describes the accompanying drawings required for describing the embodiments. It is apparent that the accompanying drawings in the following description are only some embodiments of the present disclosure. Other accompanying drawings can also be obtained by those skilled in the art according to these drawings without any creative efforts.

DETAILED DESCRIPTION

To make the objectives, technical solutions, and advantages of the present disclosure clearer, embodiments of the present disclosure would be further described in detail with reference to the accompanying drawings.

At present, NTN technology is being studied in Third Generation Partnership Project (3GPP). The NTN technology generally provides communication services to ground-based users by using satellite communication. Compared with terrestrial cellular network communication, the satellite communication has many unique advantages. Firstly, the satellite communication is not limited by geographical location of the users. For example, general terrestrial communication cannot cover areas, where a communication device cannot be set up or the communication coverage cannot be made due to the scarcity of population, such as oceans, mountains, and deserts. However, for the satellite communication, since one satellite can cover large ground and the satellite can perform orbital motion around the earth, theoretically every corner on the earth can be covered by the satellite communication. Secondly, the satellite communication has great social value. The satellite communication can cover remote mountainous areas and poor and backward countries or regions with low cost, so that people in these regions can enjoy advanced voice communication and mobile Internet technology, which is conducive to narrowing digital divide with developed regions and promoting development of the regions. Thirdly, satellite has a long distance of communication, and cost of communication does not increase significantly with increase of distance of communication. Finally, the satellite communication has high stability and is not limited by natural disasters.

Communication satellites are divided into Low-Earth Orbit (LEO) satellites, Medium-Earth Orbit (MEO) satellites, Geostationary Earth Orbit (GEO) satellites, High Elliptical Orbit (HEO) satellites, etc. The LEO satellites and the GEO satellites are mainly studied at present.

1. LEO: a height of the LEO satellites ranges from 500 km to 1500 km, and the corresponding orbital period is from 1.5 hours to 2 hours. Signal propagation delay of single hop communication between users is generally less than 20 ms. Maximum satellite visible time is 20 minutes. Signal propagation distance is short; link loss is low, and requirement on transmission power of a UE is not high.

2. GEO: an orbital height of the GEO is 35786 km, and a rotation period around the earth is 24 hours. Signal propagation delay of the single hop communication between the users is generally 250 ms.

Figure 1:
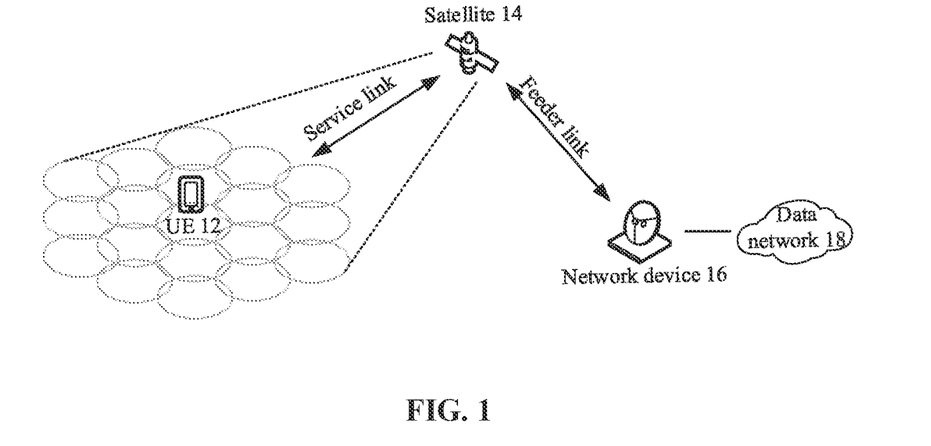
FIG. 1 is a diagram of network architecture of a pass-through load NTN according to an exemplary embodiment of the present disclosure.
Figure 2:
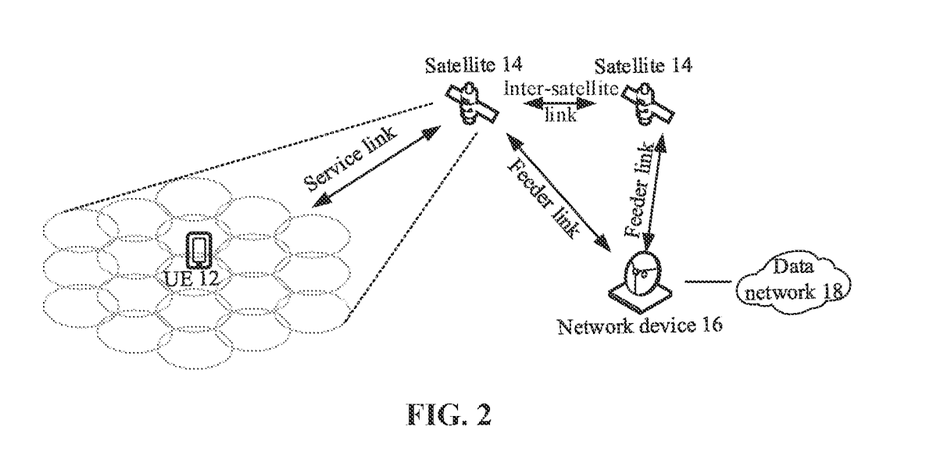
FIG. 2 is a diagram of network architecture of a regenerative load NTN according to an exemplary embodiment of the present disclosure.

In order to ensure coverage of a satellite and improve system capacity of the whole satellite communication system, the satellite covers the ground by using multiple beams. One satellite can have dozens or even hundreds of beams to cover the ground. The beams of one satellite can cover a ground area with a diameter of tens to hundreds of kilometers. There are at least two NTN scenarios: a Pass-through load NTN, as illustrated in FIG. 1, and a regenerative load NTN, as illustrated in FIG. 2.

An NTN network is composed of the following network elements.

One or more gateways which are configured to connect a satellite and a terrestrial public network.

A feeder link which is configured for communication between the gateways and the satellite.

A service link which is configured for communication between a UE and the satellite.

The satellites which can be divided into a pass-through load and a regenerative load in terms of their functions.

The pass-through load only provides functions of radio frequency filtering, frequency conversion and amplification, and only provides transparent forwarding of signals without changing forwarded waveform signals.

The regenerative load can provide the functions of demodulation/decoding, routing/conversion, and encoding/modulation in addition to providing the functions of radio frequency filtering, frequency conversion and amplification, and has part or all functions of a base station.

Inter-satellite Links (ISL) exist in the regenerative load scenario.

Figure 3:
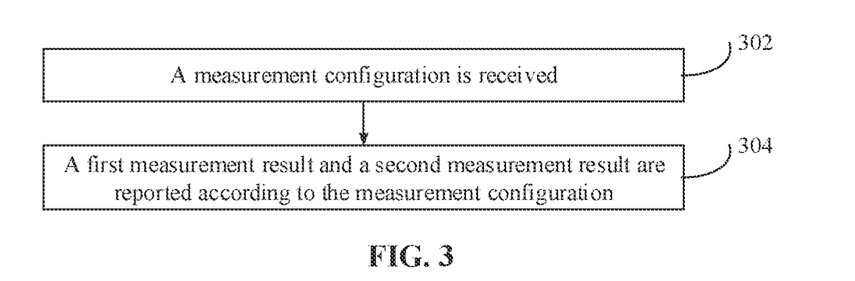
FIG. 3 is a flowchart of a method for measurement reporting in an NTN according to an exemplary embodiment of the present disclosure.

FIG. 3 is a flowchart of a method for measurement reporting in an NTN according to an exemplary embodiment of the present disclosure. The embodiment exemplifies the application of the method to a UE. The method includes the following operations.

At block 302: a measurement configuration is received.

Measurement mainly refers to mobility measurement in a connected state. After a network device issues the measurement configuration to the UE, the UE detects a signal quality state of a serving cell and/or a neighboring cell according to parameters indicated in the measurement configuration, such as a measurement object and a reporting configuration, and feeds back measurement report information to the network device for the network device to perform handover or perfect a relationship list of a serving cell and/or a neighboring cell.

The measurement configuration is the measurement configuration information sent to a UE in a connected state by the network device through Radio Resource Control (RRC) signaling. The UE performs co-frequency measurement, hetero frequency measurement or Inter-RAT measurement according to the received measurement configuration information, and reports a measurement result to the network device. Exemplarily, the measurement configuration is carried in an RRC reconfiguration message. The measurement configuration information includes, but is not limited to, at least one of a measurement object, a reporting configuration, a measurement identity or a measurement gap.

For the co-frequency measurement and the hetero frequency measurement, the measurement object indicates a time frequency position to be measured and a sub-carrier interval of a reference signal. For the Inter-RAT measurement, the measurement object corresponds to a separate Evolved Universal Terrestrial Radio Access (E-UTRA) frequency point. The network device may configure a cell offset list, a blacklist list, and a whitelist list for cells related to the measurement object. The UE does not perform any operation on cells in the blacklist list in an accident assessment and measurement report. Each measurement object corresponds to one or more reporting configurations. The reporting configuration at least includes reporting criteria, a scheduling request (RS) type, and a reporting format. The reporting criteria refers to a triggering condition that the UE performs measurement reporting. The triggering condition may be period triggered reporting or event triggered reporting. The RS type refers to an RS of the UE used for beam and cell measurement. The reporting format refers to a measurement report amount of the UE for each cell and each beam, and also includes other relevant information. For example, a maximum number of cells reported by the UE and a maximum number of beams reported for each cell. Exemplarily, measurement event supported in the measurement includes, but is not limited to, at least one of the following events: A1 event, signal quality of a serving cell is higher than a threshold; A2 event, the signal quality of the serving cell is lower than a threshold; A3 event, the signal quality of a neighboring cell is higher than the signal quality of the serving cell; A4 event, the signal quality of the neighboring cell is higher than a threshold; A5 event, the signal quality of the serving cell is lower than a first threshold, and service quality of the neighboring cell is higher than a second threshold; B1 event, signal quality of an Inter-RAT neighboring cell is higher than a threshold; B2 event, the signal quality of the serving cell is lower than a first threshold, and the signal quality of an Inter-RAT neighboring cell is higher than a second threshold. Exemplarily, the first threshold and the second threshold may be the same threshold, or may be different thresholds. The measurement identity is configured to distinguish an association relationship between the measurement objects and the reporting configurations. One measurement object may be associated with multiple reporting configurations simultaneously; and one reporting configuration may also be associated with multiple measurement objects. A specific relationship between the measurement objects and the reporting configurations may be distinguished by the measurement identity. The measurement gap refers to a period that the UE performs the measurement.

Exemplarily, the measurement configuration includes at least one of a measurement object, a measurement period, a measurement gap or a measurement configuration. Exemplarily, the measurement configuration may include, but is not limited to, at least one of the following: a first measurement configuration and a second measurement configuration. The first measurement configuration is a measurement configuration related to a position. The second measurement configuration is a measurement configuration related to signal quality. Specific meanings of the first measurement configuration and the second measurement configuration would be described in the following content.

Exemplarily, the UE receives the RRC reconfiguration message issued by the network device. The RRC reconfiguration message carries the measurement configuration. There are multiple implementation modes for the UE to receive the measurement configuration, which are not limited in the present disclosure.

At block 304, a first measurement result and a second measurement result are reported according to the measurement configuration.

Exemplarily, the first measurement result and the second measurement result are simultaneously reported according to the measurement configuration. Exemplarily, the first measurement result is a measurement result related to the position. The second measurement result is a measurement result of at least one of the signal quality of the serving cell or the signal quality of the neighboring cell. The first measurement result is a result obtained according to the measurement configuration related to the position. The second measurement result is a result obtained according to the measurement configuration related to the signal quality.

Exemplarily, the first measurement result includes, but is not limited to, at least one of the following results.

A distance from the UE to a satellite of the serving cell.
A distance from the UE to a satellite of the neighboring cell.
A distance from the UE to a satellite coverage reference point of the serving cell.
A distance from the UE to a satellite coverage reference point of the neighboring cell.
An elevation angle from the UE to the satellite of the serving cell.
An elevation angle from the UE to the satellite of the neighboring cell.
A Time Advance (TA) from the UE to the satellite of the serving cell.
A TA from the UE to the satellite of the neighboring cell.
A position of the UE.

The distance from the UE to the satellite of the serving cell or the neighboring cell refers to the linear distance from the UE to the satellite. Due to transmission delay of a signal in space, the TA from the UE to the satellite of the serving cell or the neighboring cell is determined according to the distance from the UE to the satellite of the serving cell or the neighboring cell. The position of the UE may be longitude and latitude information of the UE.

Exemplarily, the second measurement result includes, but is not limited to, at least one of the signal quality of the serving cell or the signal quality of the neighboring cell. The signal quality of the cell includes, but is not limited to, at least one of the following: Reference Signal Receiving Power (RSRP), Reference Signal Receiving Quality (RSRQ), and Signal to Interference plus Noise Ratio (SINR). Exemplarily, the second measurement result includes, but is not limited to, at least one of the following measurement results: the RSRP, the RSRQ, and the SINR.

In conclusion, according to the method for measurement reporting provided by the embodiment of the present disclosure, the UE simultaneously reports the measurement configuration related to the position and the measurement configuration related to the signal quality, so that the network device can receive multiple types of measurement results simultaneously, which provides a more reliable basis for the network device in the NTN scenario to decide whether to perform network handover, avoids missing an appropriate handover preparation occasion, and ensures stable and smooth network usage while the UE is on the move.

In the measurement reporting process in the NTN, there are multiple possibilities for the measurement configurations received by the UE. For different measurement configurations received, the UE will perform specific operations. Taking the measurement configuration including a first measurement configuration and a second measurement configuration as an example, the present disclosure provides the following three optional solutions.

(1) A UE sends measurement report in a case that the first measurement result satisfies a measurement configuration related to the position.

Figure 4:
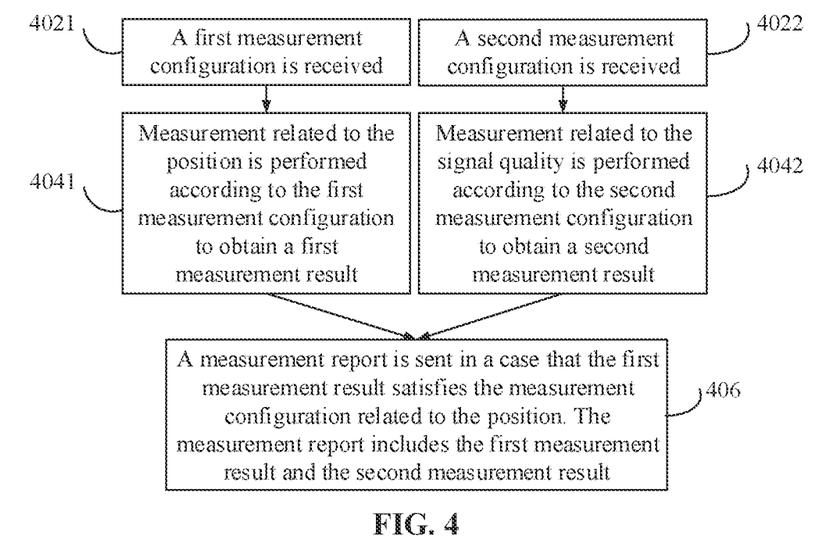
FIG. 4 is a flowchart of a method for measurement reporting in an NTN according to an exemplary embodiment of the present disclosure.

Exemplarily, as illustrated in FIG. 4, a method for measurement reporting in an NTN provided by an embodiment of the present disclosure includes the following operations.

At block 4021, a first measurement configuration is received.

Exemplarily, the first measurement configuration is a measurement configuration related to the position. The measurement configuration is configured to indicate a triggering condition when reporting needs to be performed. Exemplarily, the measurement configuration related to the position (or a measurement reporting configuration or a reporting condition) includes at least one of the following.

A measurement configuration of the distance from the UE to the satellite of the serving cell.

A measurement configuration of the distance from the UE to the satellite of the neighboring cell.

A measurement configuration of the distance from the UE to the satellite coverage reference point of the serving cell.

A measurement configuration of the distance from the UE to the satellite coverage reference point of the neighboring cell.

The measurement configuration of the distance may include, but is not limited to, at least one of a distance offset or a distance threshold. The distance offset is configured to indicate an offset between the first distance which is a distance from the UE to the satellite of the serving cell and the second distance which is a distance from the UE to the satellite of the neighboring cell. The distance threshold is configured for a relevant threshold of the first distance from the UE to the satellite of the serving cell, and/or, a relevant threshold of the first distance from the UE to the satellite of the neighboring cell.

In an example, when a difference between the distance from the UE to the satellite coverage reference point of the serving cell and the distance from the UE to the satellite coverage reference point of the neighboring cell is greater than the distance offset, the UE triggers the measurement reporting related to the position.

In another example, or when the distance from the UE to the satellite coverage reference point of the serving cell is greater than a distance threshold 1 and the distance from the UE to the satellite coverage reference point of the neighboring cell is less than a distance threshold 2, the UE triggers the measurement reporting related to the position.

A measurement configuration of an elevation angle from the UE to the satellite of the serving cell.

A measurement configuration of an elevation angle from the UE to the satellite of the neighboring cell.

The measurement configuration of the elevation angle includes, but is not limited to, at least one of an elevation angle offset or an elevation angle threshold. The elevation angle offset is configured to indicate an offset between a first elevation angle from the UE to the satellite of the serving cell and a second elevation angle from the UE to the satellite of the neighboring cell. The elevation angle threshold is configured for a relevant threshold of the first elevation angle from the UE to the satellite of the serving cell, and/or, a relevant threshold of the first elevation angle from the UE to the satellite of the neighboring cell.

In an example, when a difference between the elevation angle from the UE to the satellite of the serving cell and the elevation angle from the UE to the satellite of the neighboring cell is greater than the elevation angle offset, the UE triggers the measurement reporting related to the position.

In another example, or when the elevation angle from the UE to the satellite of the serving cell is less than an elevation angle threshold 1 and the elevation angle from the UE to the satellite of the neighboring cell is greater than an elevation angle threshold 2, the UE triggers the measurement reporting related to the position.

A measurement configuration of a TA from the UE to the satellite of the serving cell.

A measurement configuration of a TA from the UE to the satellite of the neighboring cell.

For example, a TA offset, and a TA threshold. The TA offset is configured to indicate an offset between a first TA from the UE to the satellite of the serving cell and a second TA from the UE to the satellite of the neighboring cell. The TA threshold is configured for a relevant threshold of the first TA from the UE to the satellite of the serving cell, and/or, a relevant threshold of the first TA from the UE to the satellite of the neighboring cell.

A measurement configuration of a position of the UE.

Exemplarily, the UE receives the RRC reconfiguration message issued by the network device. The RRC reconfiguration message carries the measurement configuration. The measurement configuration refers to the first measurement configuration. The first measurement configuration includes, but is not limited to, at least one of the following measurement configurations: the distance from the UE to the satellite of the serving cell, the distance from the UE to the satellite of the neighboring cell, the distance from the UE to the satellite coverage reference point of the serving cell, the distance from the UE to the satellite coverage reference point of the neighboring cell, the elevation angle from the UE to the satellite of the serving cell, the elevation angle from the UE to the satellite of the neighboring cell, the TA from the UE to the satellite of the serving cell, the TA from the UE to the neighboring cell, and the position of the UE.

At block 4041, measurement related to the position is performed according to the first measurement configuration to obtain a first measurement result.

The UE executes a measurement instruction according to the received first measurement configuration, and performs measurement on an absolute position and/or a relative position of the UE in the serving cell and/or the neighboring cell to obtain the first measurement result.

Exemplarily, the first measurement result is a measurement result related to the position, which includes, but is not limited to, at least one of the following results: the distance from the UE to the satellite of the serving cell, the distance from the UE to the satellite of the neighboring cell, the distance from the UE to the satellite coverage reference point of the serving cell, the distance from the UE to the satellite coverage reference point of the neighboring cell, the elevation angle from the UE to the satellite of the serving cell, the elevation angle from the UE to the satellite of the neighboring cell, the TA from the UE to the satellite of the serving cell, the TA from the UE to the neighboring cell, and the position of the UE.

Exemplarily, the UE performs measurement according to the above-mentioned first measurement configuration to obtain a specific distance from the UE to the satellite coverage reference point of the serving cell and a specific distance from the UE to the satellite coverage reference point of the neighboring cell, and determines whether the measurement result satisfies a reporting condition according to the measurement configuration contained in the measurement configuration.

At block 4022, a second measurement configuration is received.

Exemplarily, the second measurement configuration is a measurement configuration related to the signal quality.

Exemplarily, the UE receives the RRC reconfiguration message issued by the network device. The RRC reconfiguration message carries the measurement configuration. The measurement configuration refers to the second measurement configuration. The second measurement configuration includes, but is not limited to, at least one of the signal quality of the serving cell or the signal quality of the neighboring cell. The signal quality of the cell includes, but is not limited to, at least one of the RSRP, the RSRQ, or the SINR.

At block 4042, measurement related to the signal quality is performed according to the second measurement configuration to obtain a second measurement result.

The UE executes a measurement instruction according to the received second measurement configuration, and performs measurement on the signal quality of the UE in the serving cell and/or the neighboring cell to obtain the second measurement result.

Exemplarily, the second measurement configuration received by the UE includes, but is not limited to, one of the following measurement configurations: the measurement configuration of the RSRP of the UE in the serving cell, the measurement configuration of the RSRP of the UE in the neighboring cell, the measurement configuration of the RSRQ of the UE in the serving cell, the measurement configuration of the RSRQ of the UE in the neighboring cell, the measurement configuration of the SINR of the UE in the serving cell, and the measurement configuration of the SINR of the UE in the neighboring cell.

Exemplarily, the second measurement result includes, but is not limited to, at least one of the signal quality of the serving cell or the signal quality of the neighboring cell. The signal quality of the cell includes, but is not limited to, at least one of the RSRP, the RSRQ, or the SINR.

Exemplarily, the measurement configuration related to the signal quality (or a measurement reporting configuration or a reporting condition) includes at least one of the RSRP, the RSRQ, or the SINR.

Exemplarily, the operation at block 4021 and the operation at block 4041 may be before the operation at block 4022 and the operation at block 4042. Alternatively the operation at block 4021 and the operation at block 4041 may be after the operation at block 4022 and the operation at block 4042. Alternatively, the operations at block 4021, the operation at block 4041, the operation at block 4022 and the operation at block 4042 may be performed simultaneously. No limits are made thereto in the disclosure.

At block 406, a measurement report is sent in a case that the first measurement result satisfies the measurement configuration related to the position. The measurement report includes the first measurement result and the second measurement result.

Exemplarily, the measurement report includes the first measurement result and the additional second measurement result. Exemplarily, the condition whether the first measurement result satisfies the measurement configuration related to the position may be set according to actual needs. Exemplarily, the first measurement result is the distance from the UE to the satellite coverage reference point of the serving cell and the distance from the UE to the satellite coverage reference point of the neighboring cell. When the difference between the distance from the UE to the satellite coverage reference point of the serving cell and the distance from the UE to the satellite coverage reference point of the neighboring cell is greater than the distance offset, the measurement report is sent.

The measurement reporting refers to that the measurement reporting is performed when a certain triggering condition is satisfied after the UE performs the measurement according to the measurement configuration issued by a network. The UE would complete a measurement report when the reporting condition is satisfied, and report the measurement report to the network device. The measurement reporting and the measurement report are different expressions of the same information.

Exemplarily, the first measurement result includes, but is not limited to, at least one of the following measurement results: the distance from the UE to the satellite of the serving cell, the distance from the UE to the satellite of the neighboring cell, the distance from the UE to the satellite coverage reference point of the serving cell, the distance from the UE to the satellite coverage reference point of the neighboring cell, the elevation angle from the UE to the satellite of the serving cell, the elevation angle from the UE to the satellite of the neighboring cell, the TA from the UE to the satellite of the serving cell, the TA from the UE to the neighboring cell, and the position of the UE.

Exemplarily, the second measurement result is added to the first measurement result, which includes, but is not limited to, at least one of the signal quality of the serving cell or the signal quality of the neighboring cell. The signal quality of the cell includes, but is not limited to, at least one of the RSRP, the RSRQ, or the SINR.

Exemplarily, according to the above description, there are multiple cases that the first measurement result satisfies the measurement configuration related to the position. For example, when the difference between the distance from the UE to the satellite of the serving cell and the distance from the UE to the satellite of the neighboring cell is greater than the distance offset, the UE sends the measurement report. When the distance from the UE to the satellite coverage reference point of the serving cell is greater than the distance threshold 1 and the distance from the UE to the satellite coverage reference point of the neighboring cell is less than the distance threshold 2, the UE sends the measurement report. When the difference between the elevation angle from the UE to the satellite of the serving cell and the elevation angle from the UE to the satellite of the neighboring cell is greater than the elevation angle offset, the UE sends the measurement report. When the TA offset from the UE to the satellite of the serving cell is greater than the TA offset from the UE to the satellite of the neighboring cell, the UE sends the measurement report. When the TA threshold from the UE to the satellite of the serving cell is greater than the TA threshold from the UE to the satellite of the neighboring cell, the UE sends the measurement report.

(2) The UE sends the measurement report in a case that a second measurement result satisfies a measurement configuration related to the signal quality.

Figure 5:
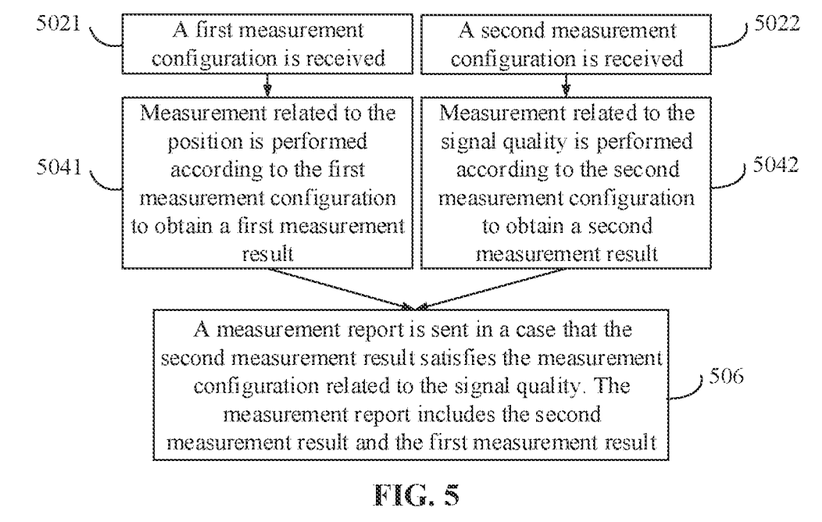
FIG. 5 is a flowchart of a method for measurement reporting in an NTN according to an exemplary embodiment of the present disclosure.

Exemplarily, as illustrated in FIG. 5, a method for measurement reporting in an NTN provided by an embodiment of the present disclosure includes the following operations.

At block 5021, a first measurement configuration is received.

Exemplarily, the first measurement configuration is a measurement configuration related to the position. The measurement configuration is configured to indicate a triggering condition when reporting needs to be performed. Exemplarily, the measurement configuration related to the position (or a measurement reporting configuration or a reporting condition) includes at least one of the following: a measurement configuration of a distance from the UE to a satellite of a serving cell, a measurement configuration of a distance from the UE to a satellite of a neighboring cell, a measurement configuration of a distance from the UE to a satellite coverage reference point of the serving cell, a measurement configuration of a distance from the UE to a satellite coverage reference point of the neighboring cell, a measurement configuration of an elevation angle from the UE to the satellite of the serving cell, a measurement configuration of an elevation angle from the UE to the satellite of the neighboring cell, a measurement configuration of a TA from the UE to the satellite of the serving cell, a measurement configuration of a TA from the UE to the satellite of the neighboring cell, and a measurement configuration of a position of the UE.

Exemplarily, the UE receives the RRC reconfiguration message issued by the network device. The RRC reconfiguration message carries the measurement configuration. The measurement configuration refers to the first measurement configuration.

At block 5041, measurement related to the position is performed according to the first measurement configuration to obtain a first measurement result.

The UE executes a measurement instruction according to the received first measurement configuration, and performs measurement on an absolute position and/or a relative position of the UE in the serving cell and/or the neighboring cell to obtain the first measurement result.

Exemplarily, the first measurement result is a measurement result related to the position, which includes, but is not limited to, at least one of the following results: the distance from the UE to the satellite of the serving cell, the distance from the UE to the satellite of the neighboring cell, the distance from the UE to the satellite coverage reference point of the serving cell, the distance from the UE to the satellite coverage reference point of the neighboring cell, the elevation angle from the UE to the satellite of the serving cell, the elevation angle from the UE to the satellite of the neighboring cell, the TA from the UE to the satellite of the serving cell, the TA from the UE to the neighboring cell, and the position of the UE.

Exemplarily, the UE performs measurement according to the above-mentioned first measurement configuration to obtain a specific distance from the UE to the satellite coverage reference point of the serving cell and a specific distance from the UE to the satellite coverage reference point of the neighboring cell, and determines whether the measurement result satisfies a reporting condition according to the measurement configuration contained in the measurement configuration.

Exemplarily, the operations at the blocks 5021 and 5041 may be performed by the UE within a preset time threshold or within a preset distance threshold. In other words, the first measurement result is obtained by the UE within the preset time threshold or within the preset distance threshold.

At block 5022, a second measurement configuration is received.

Exemplarily, the second measurement configuration is a measurement configuration related to the signal quality.

Exemplarily, the UE receives the RRC reconfiguration message issued by the network device. The RRC reconfiguration message carries the measurement configuration. The measurement configuration refers to the second measurement configuration. The second measurement configuration includes, but is not limited to, at least one of the signal quality of the serving cell or the signal quality of the neighboring cell. The signal quality of the cell includes, but is not limited to, at least one of the RSRP, the RSRQ, or the SINR.

At block 5042, measurement related to the signal quality is performed according to the second measurement configuration to obtain a second measurement result.

The UE executes a measurement instruction according to the received second measurement configuration, and performs measurement on the signal quality of the UE in the serving cell and/or the neighboring cell to obtain the second measurement result.

Exemplarily, the second measurement configuration received by the UE includes, but is not limited to, one of the following measurement configurations: the measurement configuration of the RSRP of the UE in the serving cell, the measurement configuration of the RSRP of the UE in the neighboring cell, the measurement configuration of the RSRQ of the UE in the serving cell, the measurement configuration of the RSRQ of the UE in the neighboring cell, the measurement configuration of the SINR of the UE in the serving cell, and the measurement configuration of the SINR of the UE in the neighboring cell.

Exemplarily, the second measurement result includes, but is not limited to, at least one of the signal quality of the serving cell or the signal quality of the neighboring cell. The signal quality of the cell includes, but is not limited to, at least one of the RSRP, the RSRQ, or the SINR.

Exemplarily, the measurement configuration related to the signal quality (or a measurement reporting configuration or a reporting condition) includes at least one of the RSRP, the RSRQ, or the SINR.

Exemplarily, the operation at block 5021 and the operation at block 5041 may be before the operation at block 5022 and the operation at block 5042. Alternatively the operation at block 5021 and the operation at block 5041 may be after the operation at block 5022 and the operation at block 5042. Alternatively, the operations at block 5021, the operation at block 5041, the operation at block 5022 and the operation at block 5042 may be performed simultaneously. No limits are made thereto in the disclosure.

At block 506, a measurement report is sent in a case that the second measurement result satisfies the measurement configuration related to the signal quality. The measurement report includes the second measurement result and the first measurement result.

Exemplarily, the measurement report includes the second measurement result and the additional first measurement result. Exemplarily, the condition whether the second measurement result satisfies the measurement configuration related to the signal quality may be set according to actual needs.

Exemplarily, the first measurement result is added to the second measurement result, and includes, but is not limited to, at least one of the following measurement results: the distance from the UE to the satellite of the serving cell, the distance from the UE to the satellite of the neighboring cell, the distance from the UE to the satellite coverage reference point of the serving cell, the distance from the UE to the satellite coverage reference point of the neighboring cell, the elevation angle from the UE to the satellite of the serving cell, the elevation angle from the UE to the satellite of the neighboring cell, the TA from the UE to the satellite of the serving cell, the TA from the UE to the neighboring cell, and the position of the UE.

Exemplarily, according to the previous description, there are multiple cases that the second measurement result satisfies a measurement configuration related to the signal quality. For example, when the signal quality of the UE in the serving cell is higher than a signal quality threshold, the UE sends the measurement report. When the signal quality of the UE in the serving cell is lower than the signal quality threshold, the UE sends the measurement report. When the signal quality of the UE in the serving cell is lower than a signal quality threshold of the signal quality in the neighboring cell, the UE sends the measurement report. When the signal quality of the UE in the serving cell is lower than a signal quality threshold 1 and the signal quality of the UE in the serving cell is higher than a signal quality threshold 2, the UE sends the measurement report.

(3) The UE sends the measurement report in a case that a first measurement result satisfies a measurement configuration related to the position and a second measurement result satisfies a measurement configuration related to the signal quality.

Figure 6:
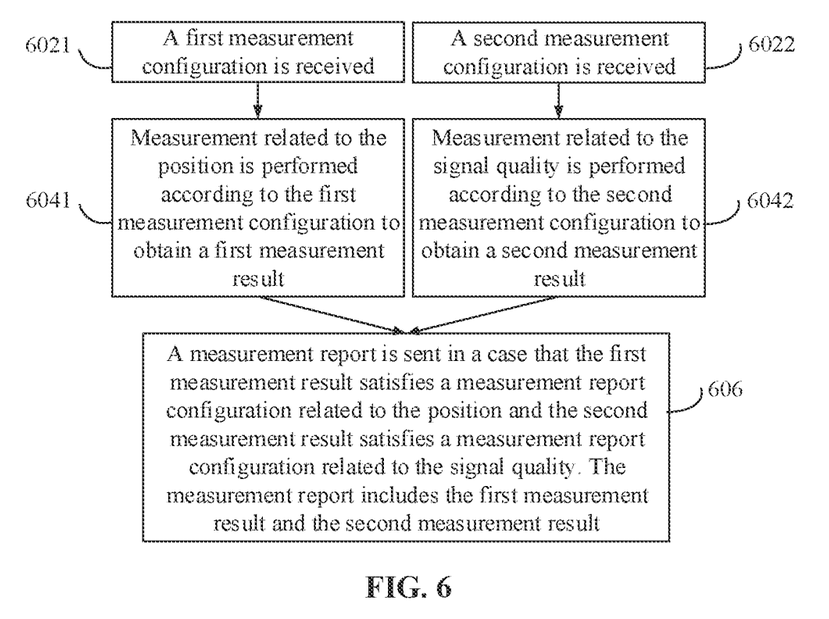
FIG. 6 is a flowchart of a method for measurement reporting in an NTN according to an exemplary embodiment of the present disclosure.

Exemplarily, as illustrated in FIG. 6, a method for measurement reporting in an NTN provided by an embodiment of the present disclosure includes the following operations.

At block 6021, a first measurement configuration is received.

At block 6041, measurement related to the position is performed according to the first measurement configuration to obtain a first measurement result.

At block 6022, a second measurement configuration is received.

At block 6042, measurement related to the signal quality is performed according to the second measurement configuration to obtain a second measurement result.

Exemplarily, specific operations at blocks 6021 and 6041 are the same as operations at blocks 4021 and 4041. Specific operations at blocks 6022 and 6042 are the same as operations at blocks 5021 and 5042, which would not be elaborated herein. Exemplarily, the operation at block 6021 and the operation at block 6041 may be before the operation at block 6022 and the operation at block 6042. Alternatively the operation at block 6021 and the operation at block 6041 may be after the operation at block 6022 and the operation at block 6042. Alternatively, the operations at block 6021, the operation at block 6041, the operation at block 6022 and the operation at block 6042 may be performed simultaneously. No limits are made thereto in the disclosure.

At block 606, a measurement report is sent in a case that the first measurement result satisfies a measurement configuration related to the position and the second measurement result satisfies a measurement configuration related to the signal quality. The measurement report includes the first measurement result and the second measurement result.

Exemplarily, the measurement reporting is also referred to as a measurement report.

In conclusion, according to the method for measurement reporting provided by the embodiment of the present disclosure, the UE simultaneously reports the measurement configuration related to the signal quality and the measurement configuration related to the position, so that the network device can receive multiple types of measurement results simultaneously, which provides a more reliable basis for the network device in the NTN scenario to decide whether to perform network handover.

Figure 7:
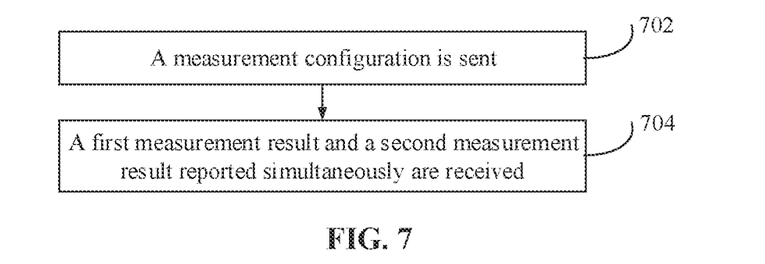
FIG. 7 is a flowchart of a method for receiving a measurement report in an NTN according to an exemplary embodiment of the present disclosure.

In the NTN scenario, the network device needs to make a decision on network handover after receiving the measurement report sent by the UE. As illustrated in FIG. 7, embodiments of the present disclosure provide a method for receiving a measurement report in an NTN, which is applied to a network device and includes the following operations.

At block 702, a measurement configuration is sent.

Exemplarily, a network device sends a measurement configuration to a UE. The measurement configuration includes at least one of a first measurement configuration or a second measurement configuration. Exemplarily, the measurement configuration sent to the UE by the network device is carried in an RRC reconfiguration message.

At block 704, a first measurement result and a second measurement result reported simultaneously are received.

Exemplarily, the first measurement result is a measurement result related to the position. The second measurement result is a measurement result of at least one of signal quality of a serving cell or signal quality of a neighboring cell.

Exemplarily, the network device receives the first measurement result and the second measurement result reported simultaneously by the UE. The first measurement result and the second measurement result have been described above, and would not be elaborated.

Taking the measurement configuration including a first measurement configuration and a second measurement configuration as an example, the present disclosure provides the following three optional solutions of a method for receiving measurement report in an NTN according to the above-mentioned three optional solutions of the method for measurement reporting in the NTN.

(1) A network device receives the measurement report sent by a UE in a case that a measurement configuration related to the position is satisfied.

Figure 8:
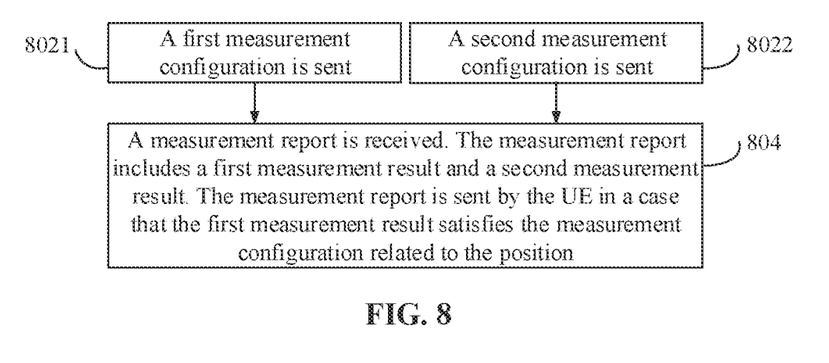
FIG. 8 is a flowchart of a method for receiving a measurement report in an NTN according to an exemplary embodiment of the present disclosure.

Exemplarily, as illustrated in FIG. 8, a method for receiving a measurement report in an NTN provided by an embodiment of the present disclosure includes the following operations.

At block 8021, a first measurement configuration is sent.

Exemplarily, the first measurement configuration is a measurement configuration related to the position. Exemplarily, a network device sends the first measurement configuration to the UE.

At block 8022, a second measurement configuration is sent.

Exemplarily, the second measurement configuration is a measurement configuration related to the signal quality. The second measurement result is the measurement result of at least one of the signal quality of the serving cell or the signal quality of the neighboring cell. Exemplarily, the network device sends the second measurement configuration to the UE.

Exemplarily, the first measurement configuration and the second measurement configuration may be simultaneously carried in the same RRC reconfiguration message sent to the UE by the network device. Alternatively, the first measurement configuration is carried in a first RRC reconfiguration message, and the second measurement configuration is carried in a second RRC reconfiguration message.

Exemplarily, the operation at block 8021 is before the operation at block 8022. Alternatively, the operation at block 8021 is after the operation at block 8022. Alternatively, the operation at block 8021 and the operation at block 8022 are performed simultaneously. No limits are made thereto in the disclosure.

At block 804, a measurement report is received. The measurement report includes a first measurement result and a second measurement result. The measurement report is sent by the UE in a case that the first measurement result satisfies the measurement configuration related to the position.

Exemplarily, the measurement reporting is also referred to as a measurement report.

Exemplarily, the measurement report received by the network device refers to a measurement result obtained by performing reporting by the UE in a case that the first measurement result satisfies the measurement configuration related to the position. Exemplarily, the network device receives the first measurement result and the additional second measurement result reported by the UE. The first measurement result is a measurement result related to the position. The second measurement result is a measurement result of at least one of the signal quality of the serving cell or the signal quality of the neighboring cell.

(2) A network device receives a measurement report sent by a UE in a case that a measurement configuration related to the signal quality is satisfied.

Figure 9:
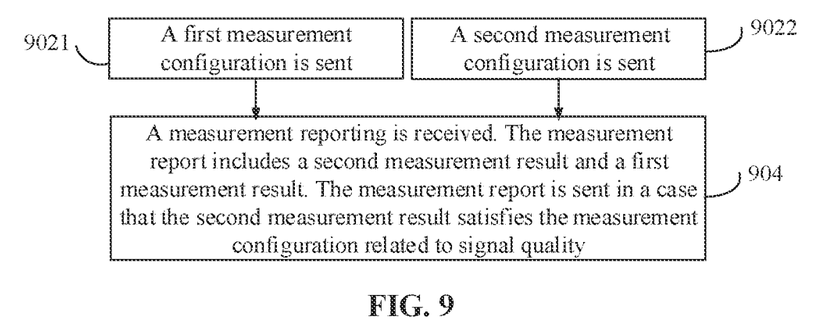
FIG. 9 is a flowchart of a method for receiving a measurement report in an NTN according to an exemplary embodiment of the present disclosure.

Exemplarily, as illustrated in FIG. 9, a method for receiving a measurement report in an NTN provided by an embodiment of the present disclosure includes the following operations.

At block 9021, a first measurement configuration is sent.

Exemplarily, the first measurement configuration is a measurement configuration related to the position. Exemplarily, a network device sends the first measurement configuration to the UE.

At block 9022, a second measurement configuration is sent.

Exemplarily, the second measurement configuration is a measurement configuration related to the signal quality. The second measurement result is a measurement result of at least one of a signal quality of a serving cell or a signal quality of a neighboring cell. Exemplarily, the network device sends the second measurement configuration to the UE.

Exemplarily, the first measurement configuration and the second measurement configuration may be simultaneously carried in the same RRC reconfiguration message sent to the UE by the network device. Alternatively, the first measurement configuration is carried in a first RRC reconfiguration message, and the second measurement configuration is carried in a second RRC reconfiguration message.

Exemplarily, the operation at block 9021 is before the operation at block 9022. Alternatively, the operation at block 9021 is after the operation at block 9022. Alternatively, the operation at block 9021 and the operation at block 9022 are performed simultaneously. No limits are made thereto in the disclosure.

At block 904, a measurement report is received. The measurement report includes a second measurement result and a first measurement result. The measurement report is sent in a case that the second measurement result satisfies the measurement configuration related to the signal quality.

Exemplarily, the first measurement result is added to the second measurement result, and includes, but is not limited to, at least one of the following measurement results: the distance from the UE to the satellite of the serving cell, the distance from the UE to the satellite of the neighboring cell, the distance from the UE to the satellite coverage reference point of the serving cell, the distance from the UE to the satellite coverage reference point of the neighboring cell, the elevation angle from the UE to the satellite of the serving cell, the elevation angle from the UE to the satellite of the neighboring cell, the TA from the UE to the satellite of the serving cell, the TA from the UE to the neighboring cell, and the position of the UE.

Exemplarily, the first measurement result may be a result obtained by performing measurement by the UE within a preset time threshold or within a preset distance threshold.

Exemplarily, the measurement report received by the network device is a measurement result obtained by performing reporting by the UE in a case that the second measurement result satisfies the measurement configuration related to the signal quality. Exemplarily, the above-mentioned measurement reporting is also referred to as a measurement report.

(3) The network device receives the measurement report sent by the UE in a case that a first measurement result satisfies a measurement configuration related to the position and a second measurement result satisfies a measurement configuration related to the signal quality.

Figure 10:
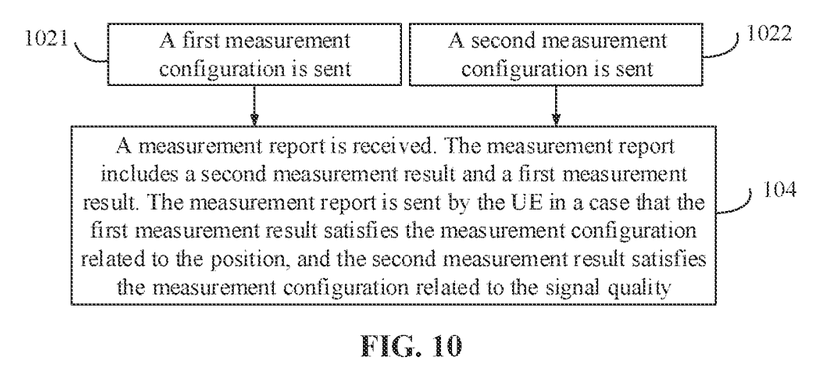
FIG. 10 is a flowchart of a method for receiving a measurement report in an NTN according to an exemplary embodiment of the present disclosure.

Exemplarily, as illustrated in FIG. 10, a method for receiving a measurement report in an NTN provided by an embodiment of the present disclosure includes the following operations.

At block 1021, a first measurement configuration is sent.

Exemplarily, the first measurement configuration is a measurement configuration related to the position. Exemplarily, a network device sends the first measurement configuration to the UE.

At block 1022, a second measurement configuration is sent.

Exemplarily, the second measurement configuration is a measurement configuration related to the signal quality. The second measurement result is a measurement result of at least one of signal quality of a serving cell or signal quality of a neighboring cell. Exemplarily, the network device sends the second measurement configuration to the UE.

Exemplarily, the first measurement configuration and the second measurement configuration may be simultaneously carried in the same RRC reconfiguration message sent to the UE by the network device. Alternatively, the first measurement configuration is carried in a first RRC reconfiguration message, and the second measurement configuration is carried in a second RRC reconfiguration message.

Exemplarily, the operation at block 1021 is before the operation at block 1022. Alternatively, the operation at block 1021 is after the operation at block 1022. Alternatively, the operation at block 1021 and the operation at block 1022 are performed simultaneously. No limits are made thereto in the disclosure.

At block 104, a measurement report is received. The measurement report includes a first measurement result and a second measurement result. The measurement report is sent by the UE in a case that the first measurement result satisfies the measurement configuration related to the position, and the second measurement result satisfies the measurement configuration related to the signal quality.

Exemplarily, the measurement report received by the network device is a measurement result obtained by performing reporting by the UE in a case that the first measurement result satisfies the measurement configuration related to the position and the second measurement result satisfies the measurement configuration related to the signal quality. Exemplarily, the network device receives the first measurement result and the second measurement result simultaneously reported by the UE. Exemplarily, the above-mentioned measurement reporting is also referred to as a measurement report.

In conclusion, according to the method for receiving a measurement report in an NTN provided by the embodiments of the present disclosure, the network device receives multiple measurement results of different types simultaneously, so as to make a more accurate decision on whether the UE needs to perform network handover, thereby ensuring that the use of the UE is not affected when moving between the serving cell and the neighboring cell, and ensuring the network connectivity of the UE.

Figure 11:
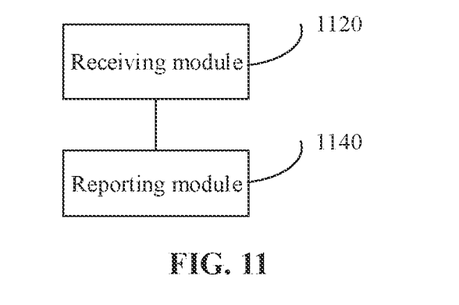
FIG. 11 is a structural diagram of a measurement reporting apparatus in an NTN according to an exemplary embodiment of the present disclosure.

FIG. 11 is block diagram of a measurement reporting apparatus in an NTN provided by an embodiment of the present disclosure. The apparatus may be implemented as all or a part of a UE, or may be applied to the UE. The UE is a UE supporting the NTN. The apparatus includes a receiving module 1120, and a reporting module 1140.

The receiving module 1120 is configured to receive a measurement configuration.

The reporting module 1140 is configured to report a first measurement result and a second measurement result according to the measurement configuration. The first measurement result is a measurement result related to the position. The second measurement result is a measurement result of at least one of signal quality of a serving cell or signal quality of a neighboring cell.

In an optional design of the present disclosure, the measurement configuration includes a first measurement configuration. The first measurement configuration is a measurement configuration related to the position. The reporting module 1140 is further configured to send measurement report in a case that a first measurement result satisfies the measurement configuration related to the position. The measurement report includes the first measurement result and the second measurement result.

In an optional design of the present disclosure, the measurement configuration includes a second measurement configuration. The second measurement configuration is a measurement configuration related to the signal quality. The reporting module 1140 is further configured to send the measurement report in a case that the second measurement result satisfies the measurement configuration related to the signal quality. The measurement report includes the second measurement result and the first measurement result.

In an optional design of the present disclosure, the measurement configuration includes the first measurement configuration and the second measurement configuration. The first measurement configuration is the measurement configuration related to the position. The second measurement configuration is the measurement configuration related to the signal quality. The reporting module 1140 is further configured to send the measurement report in a case that the first measurement result satisfies the measurement configuration related to the position and the second measurement result satisfies the measurement configuration related to the signal quality. The measurement report includes the first measurement result and the second measurement result.

In an optional design of the present disclosure, the first measurement result may include at least one of the following measurement results: a distance from the UE to a satellite of the serving cell, a distance from the UE to a satellite of the neighboring cell, a distance from the UE to a satellite coverage reference point of the serving cell, a distance from the UE to a satellite coverage reference point of the neighboring cell, an elevation angle from the UE to the satellite of the serving cell, an elevation angle from the UE to the satellite of the neighboring cell, a TA from the UE to the satellite of the serving cell, a TA from the UE to the satellite of the neighboring cell, and a position of the UE.

In an optional design of the present disclosure, the second measurement result may include at least one of RSRP, RSRQ, and SINR.

Exemplarily, the above-mentioned measurement reporting is also referred to as a measurement report.

Figure 12:
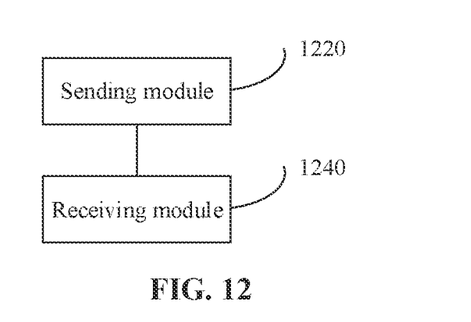
FIG. 12 is a schematic structural diagram of an apparatus for receiving a measurement report in an NTT according to an exemplary embodiment of the present disclosure.

Exemplarily, as illustrated in FIG. 12, the present disclosure provides an apparatus for receiving a measurement report apparatus in an NTN. The apparatus may be implemented as all or a part of a UE, or may be applied to the UE. The UE is a UE supporting the NTN. The apparatus includes a sending module 1220 and a receiving module 1240.

The sending module 1220 is configured to send a measurement configuration.

The receiving module 1240 is configured to receive a first measurement result and a second measurement result reported simultaneously. The first measurement result is a measurement result related to the position. The second measurement result is a measurement result of at least one of signal quality of a serving cell or signal quality of a neighboring cell.

In an optional design of the present disclosure, the measurement configuration includes a first measurement configuration. The first measurement configuration is a measurement configuration related to the position. The receiving module 1240 is further configured to receive measurement report. The measurement report includes a first measurement result and a second measurement result. The measurement report is sent by the UE in a case that the first measurement result satisfies the measurement configuration related to the position.

In an optional design of the present disclosure, the measurement configuration includes a second measurement configuration. The second measurement configuration is a measurement configuration related to the signal quality. The receiving module 1240 is further configured to receive the measurement report. The measurement report includes a second measurement result and a first measurement result. The measurement report is sent in a case that the second measurement result satisfies the measurement configuration related to the signal quality.

In an optional design of the present disclosure, the measurement configuration includes the first measurement configuration and the second measurement configuration. The first measurement configuration is a measurement configuration related to the position. The second measurement configuration is a measurement configuration related to the signal quality. The receiving module 1240 is further configured to receive the measurement report. The measurement report includes a first measurement result and a second measurement result. The measurement report is sent in a case that the first measurement result satisfies the measurement configuration related to the position and the second measurement result satisfies the measurement configuration related to the signal quality.

In an optional design of the present disclosure, the first measurement result includes at least one of the following measurement results: a distance from the UE to a satellite of the serving cell, a distance from the UE to a satellite of the neighboring cell, a distance from the UE to a satellite coverage reference point of the serving cell, a distance from the UE to a satellite coverage reference point of the neighboring cell, an elevation angle from the UE to the satellite of the serving cell, an elevation angle from the UE to the satellite of the neighboring cell, a TA from the UE to the satellite of the serving cell, a TA from the UE to the satellite of the neighboring cell, and a position of the UE.

In an optional design of the present disclosure, the second measurement result may include at least one of RSRP, RSRQ, and SINR.

Exemplarily, the above-mentioned measurement reporting is also referred to as a measurement report.

Figure 13:
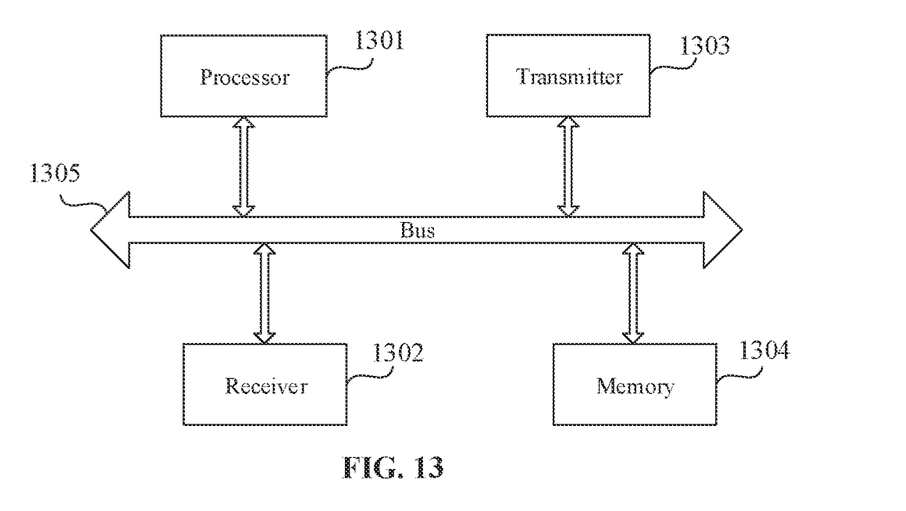
FIG. 13 is a block diagram of a communication device according to an exemplary embodiment of the present disclosure.

FIG. 13 illustrates a communication device (a UE or a network device) according to an exemplary embodiment of the present disclosure. The communication device includes a processor 1301, a receiver 1302, a transmitter 1303, a memory 1304, and a bus 1305.

The processor 1301 includes one or more processing cores. The processor 1301 executes various functional applications and information processing by running software programs and modules. The receiver 1302 and the transmitter 1303 may be implemented as a communication component. The communication component may be a communication chip. The memory 1304 is connected to the processor 1301 through the bus 1305. The memory 1304 may be configured to store at least one instruction. The processor 1301 is configured to execute the at least one instruction to implement various operations mentioned in the above-mentioned method embodiments. In addition, the memory 1304 may be implemented by any type of volatile or non-volatile memory devices, or a combination thereof. The volatile or non-volatile memory devices may include, but are not limited to, a magnetic disk or a compact disk, an Electrically-Erasable Programmable Read Only Memory (EEPROM), an Electrical Programmable Read Only Memory (EPROM), a Static Random Access Memory (SRAM), a Read-Only Memory (ROM), a magnetic memory, a flash memory, and a Programmable Read-Only Memory (PROM).

Exemplarily, as illustrated in FIG. 13, the present disclosure provides a computer device, which is applied to a UE. The computer device includes a processor 1301 and a memory 1304. The memory 1304 stores at least one instruction, at least one program, a code set or an instruction set. The at least one instruction, the at least one program, the code set, or the instruction set are loaded and executed by the processor 1301 to implement the method for measurement reporting in the NTN as described above.

Exemplarily, as illustrated in FIG. 13, the disclosure provides a computer device, which is applied to a network device. The computer device includes a processor 1301 and a memory 1304. The memory 1304 stores at least one instruction, at least one program, a code set or an instruction set. The at least one instruction, the at least one program, the code set, or the instruction set are loaded and executed by the processor 1301 to implement the method for receiving the measurement report in the NTN as described above.

In an exemplary example, a computer-readable storage medium is further provided. The readable storage medium stores at least one instruction, at least one program, a code set or an instruction set. The at least one instruction, the at least one program, the code set, or the instruction set is loaded and executed by a processor to implement the method for measurement reporting in the NTN as described above.

In an exemplary example, a computer-readable storage medium is further provided. The computer-readable storage medium may include at least one instruction, at least one program, a code set, or an instruction set. The at least one instruction, the at least one program, the code set, or the instruction set is loaded and executed by a processor to implement the method for receiving the measurement report in the NTN as described above.

It is to be understood that the "multiple" as referred to herein means two or more. The term "and/or" is an association describing associated objects, indicating that there may be three kinds of relationships. For example, A and/or B may indicate that A exists separately, that both A and B exist simultaneously, and that B exists separately. The character "/" generally indicates that the contextual objects have an "or" relationship.

Those of ordinary skill in the art may understand that, all or part of the operations to implement the above-mentioned embodiments may be completed by means of hardware, or may be completed by instructing the related hardware through a program. The program may be stored in a computer-readable storage medium, and the storage medium may be an ROM, a magnetic disk, or an optical disk.

The foregoing descriptions are merely optional embodiments of the present disclosure, but are not intended to limit the present disclosure. Any modification, equivalent replacement, or improvement made without departing from the spirit and principle of the present disclosure shall fall within the scope of the protection of the present disclosure.

The invention claimed is:

1. A method for measurement reporting in a Non-Terrestrial Network (NTN), applied to a User Equipment (UE), the method comprising:
    receiving a measurement configuration; and
    reporting, according to the measurement configuration, a first measurement result and a second measurement result, wherein the first measurement result is a measurement result related to a position, and the second measurement result is a measurement result of signal quality of a serving cell and signal quality of a neighboring cell,
    wherein the measurement configuration comprises a second measurement configuration, and the second measurement configuration is a measurement configuration related to signal quality; and
    wherein reporting, according to the measurement configuration, the first measurement result and the second measurement result comprises:
    in a case that the second measurement result satisfies the measurement configuration related to the signal quality, sending a measurement report, the measurement report comprising the second measurement result and the first measurement result,
    wherein the second measurement result satisfying the measurement configuration related to the signal quality comprises at least one of:
    the signal quality of the serving cell being lower than a signal quality threshold;
    the signal quality of the serving cell being lower than a signal quality threshold of the signal quality of the neighboring cell; or
    the signal quality of the serving cell being lower than a signal quality threshold 1 and the signal quality of the serving cell being higher than a signal quality threshold 2.

2. The method of claim 1, wherein the measurement configuration comprises a first measurement configuration, and the first measurement configuration comprises a measurement configuration related to the position; and
    wherein reporting, according to the measurement configuration, the first measurement result and the second measurement result comprises:
        in a case that the first measurement result satisfies the measurement configuration related to the position, sending a measurement report, the measurement report comprising the first measurement result and the second measurement result.

3. The method of claim 1, wherein the measurement configuration comprises a first measurement configuration and a second measurement configuration, the first measurement configuration is a measurement configuration related to the position, and the second measurement configuration is a measurement configuration related to signal quality; and
    wherein reporting, according to the measurement configuration, the first measurement result and the second measurement result comprises:
        in a case that the first measurement result satisfies the measurement configuration related to the position and the second measurement result satisfies the measurement configuration related to the signal quality, sending a measurement report, the measurement report comprising the first measurement result and the second measurement result.

4. The method of claim 1, wherein the first measurement configuration comprises at least one of following measurement configurations:
    a measurement configuration of a distance from the UE to a satellite of the serving cell;
    a measurement configuration of a distance from the UE to a satellite of the neighboring cell;
    a measurement configuration of a distance from the UE to a satellite coverage reference point of the serving cell;
    a measurement configuration of a distance from the UE to a satellite coverage reference point of the neighboring cell;
    a measurement configuration of an elevation angle from the UE to the satellite of the serving cell;
    a measurement configuration of an elevation angle from the UE to the satellite of the neighboring cell;
    a measurement configuration of a Time Advance (TA) from the UE to the satellite of the serving cell;
    a measurement configuration of a TA from the UE to the satellite of the neighboring cell; and
    a measurement configuration of a position of the UE.

5. The method of claim 1, wherein the first measurement result comprises at least one of following measurement results:
    a distance from the UE to a satellite of the serving cell;
    a distance from the UE to a satellite of the neighboring cell;
    a distance from the UE to a satellite coverage reference point of the serving cell;
    a distance from the UE to a satellite coverage reference point of the neighboring cell;
    an elevation angle from the UE to the satellite of the serving cell;
    an elevation angle from the UE to the satellite of the neighboring cell;
    a Time Advance (TA) from the UE to the satellite of the serving cell;
    a TA from the UE to the satellite of the neighboring cell; and
    a position of the UE.

6. The method of claim 1, wherein the second measurement result comprises at least one of following measurement results:
    Reference Signal Receiving Power (RSRP);
    Reference Signal Receiving Quality (RSRQ); and
    Signal to Interference plus Noise Ratio (SINR).

7. The method of claim 1, wherein the measurement configuration is carried in a Radio Resource Control (RRC) reconfiguration message.

8. A method for receiving a measurement report in a Non-Terrestrial Network (NTN), applied to a network device, the method comprising:
    sending a measurement configuration; and
    receiving a first measurement result and a second measurement result reported simultaneously, wherein the first measurement result is a measurement result related to a position, and the second measurement result is a measurement result of at least one of signal quality of a serving cell or signal quality of a neighboring cell,
    wherein the measurement configuration comprises a second measurement configuration, and the second measurement configuration is a measurement configuration related to signal quality; and
    wherein receiving the first measurement result and the second measurement result reported simultaneously comprises:
    receiving the measurement report, the measurement report comprising the second measurement result and the first measurement result, the measurement report being sent by a User Equipment (UE) in a case that the second measurement result satisfies the measurement configuration related to the signal quality,
    wherein the second measurement result satisfying the measurement configuration related to the signal quality comprises at least one of:
    the signal quality of the serving cell being lower than a signal quality threshold;
    the signal quality of the serving cell being lower than a signal quality threshold of the signal quality of the neighboring cell; or
    the signal quality of the serving cell being lower than a signal quality threshold 1 and the signal quality of the serving cell being higher than a signal quality threshold 2.

9. The method of claim 8, wherein the measurement configuration comprises a first measurement configuration, and the first measurement configuration is a measurement configuration related to the position; and
    wherein receiving the first measurement result and the second measurement result reported simultaneously comprises:
    receiving the measurement report, the measurement report comprising the first measurement result and the second measurement result, the measurement report being sent by a User Equipment (UE) in a case that the first measurement result satisfies the measurement configuration related to the position.

10. The method of claim 8, wherein the measurement configuration comprises a first measurement configuration and a second measurement configuration, the first measurement configuration is a measurement configuration related to the position, and the second measurement configuration is a measurement configuration related to signal quality; and
    wherein reporting, according to the measurement configuration, the first measurement result and the second measurement result comprises:

receiving the measurement report, the measurement report comprising the first measurement result and the second measurement result, the measurement report being sent by a User Equipment (UE) in a case that the first measurement result satisfies the measurement configuration related to the position and the second measurement result satisfies the measurement configuration related to the signal quality.

11. The method of claim 8, wherein the first measurement configuration comprises at least one of following measurement configurations:
a measurement configuration of a distance from a User Equipment (UE) to a satellite of the serving cell;
a measurement configuration of a distance from the UE to a satellite of the neighboring cell;
a measurement configuration of a distance from the UE to a satellite coverage reference point of the serving cell;
a measurement configuration of a distance from the UE to a satellite coverage reference point of the neighboring cell;
a measurement configuration of an elevation angle from the UE to the satellite of the serving cell;
a measurement configuration of an elevation angle from the UE to the satellite of the neighboring cell;
a measurement configuration of a Time Advance (TA) from the UE to the satellite of the serving cell;
a measurement configuration of a TA from the UE to the satellite of the neighboring cell; and
a measurement configuration of a position of the UE.

12. The method of claim 8, wherein the first measurement result comprises at least one of following measurement results:
a distance from a User Equipment (UE) to a satellite of the serving cell;
a distance from the UE to a satellite of the neighboring cell;
a distance from the UE to a satellite coverage reference point of the serving cell;
a distance from the UE to a satellite coverage reference point of the neighboring cell;
an elevation angle from the UE to the satellite of the serving cell;
an elevation angle from the UE to the satellite of the neighboring cell;
a Time Advance (TA) from the UE to the satellite of the serving cell;
a TA from the UE to the satellite of the neighboring cell; and
a position of the UE.

13. The method of claim 8, wherein the measurement configuration is carried in a Radio Resource Control (RRC) reconfiguration message.

14. The method of claim 8, wherein the second measurement result comprises at least one of following measurement results:
Reference Signal Receiving Power (RSRP);
Reference Signal Receiving Quality (RSRQ); and
Signal to Interference plus Noise Ratio (SINR).

15. A User Equipment (UE), comprising a processor and a non-transitory memory, wherein the non-transitory memory stores at least one instruction, and the at least one instruction is loaded and executed by the processor to implement following operations:
receiving a measurement configuration; and
reporting, according to the measurement configuration, a first measurement result and a second measurement result, wherein the first measurement result is a measurement result related to a position, and the second measurement result is a measurement result of at least one of signal quality of a serving cell or signal quality of a neighboring cell,
wherein the measurement configuration comprises a second measurement configuration, and the second measurement configuration is a measurement configuration related to signal quality; and
wherein the at least one instruction, the at least one program, the code set or the instruction set is loaded and executed by the processor to implement following operations:
in a case that the second measurement result satisfies the measurement configuration related to the signal quality, sending a measurement report, the measurement report comprising the second measurement result and the first measurement result,
wherein the second measurement result satisfying the measurement configuration related to the signal quality comprises at least one of:
the signal quality of the serving cell being lower than a signal quality threshold;
the signal quality of the serving cell being lower than a signal quality threshold of the signal quality of the neighboring cell; or
the signal quality of the serving cell being lower than a signal quality threshold 1 and the signal quality of the serving cell being higher than a signal quality threshold 2.

16. The UE of claim 15, wherein the measurement configuration comprises a first measurement configuration, and the first measurement configuration comprises a measurement configuration related to the position; and
wherein the at least one instruction, the at least one program, the code set or the instruction set is loaded and executed by the processor to implement following operations:
in a case that the first measurement result satisfies the measurement configuration related to the position, sending a measurement report, the measurement report comprising the first measurement result and the second measurement result.

17. The UE of claim 15, wherein the first measurement configuration comprises at least one of following measurement configurations:
a measurement configuration of a distance from the UE to a satellite of the serving cell;
a measurement configuration of a distance from the UE to a satellite of the neighboring cell;
a measurement configuration of a distance from the UE to a satellite coverage reference point of the serving cell;
a measurement configuration of a distance from the UE to a satellite coverage reference point of the neighboring cell;
a measurement configuration of an elevation angle from the UE to the satellite of the serving cell;
a measurement configuration of an elevation angle from the UE to the satellite of the neighboring cell;
a measurement configuration of a Time Advance (TA) from the UE to the satellite of the serving cell;
a measurement configuration of a TA from the UE to the satellite of the neighboring cell; and
a measurement configuration of a position of the UE.

* * * * *